Nov. 26, 1963   J. GRAY   3,111,915
MERCHANDISE HANDLING RACK
Filed Feb. 5, 1962   4 Sheets-Sheet 1
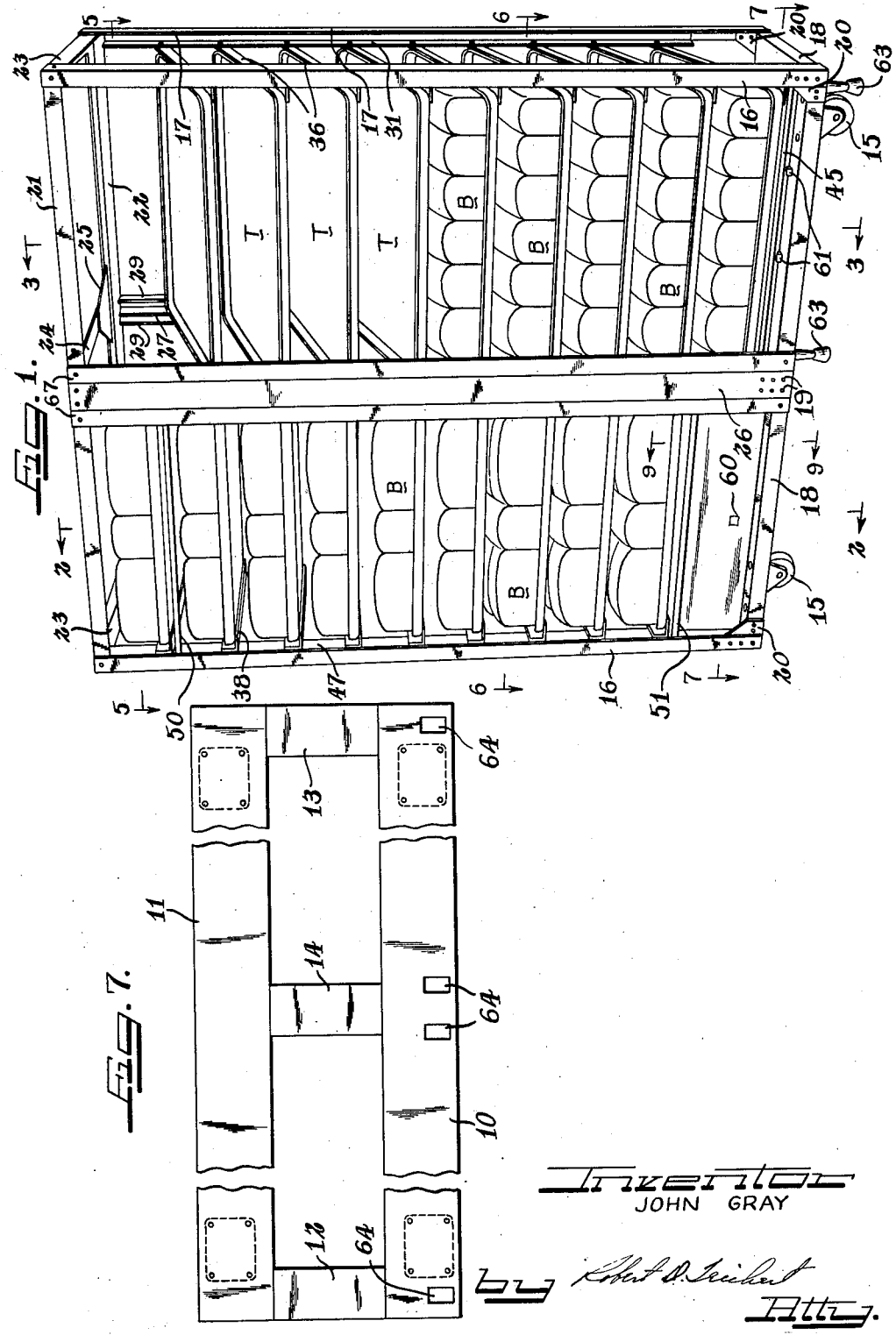
INVENTOR
JOHN GRAY Nov. 26, 1963    J. GRAY    3,111,915
MERCHANDISE HANDLING RACK
Filed Feb. 5, 1962    4 Sheets-Sheet 2
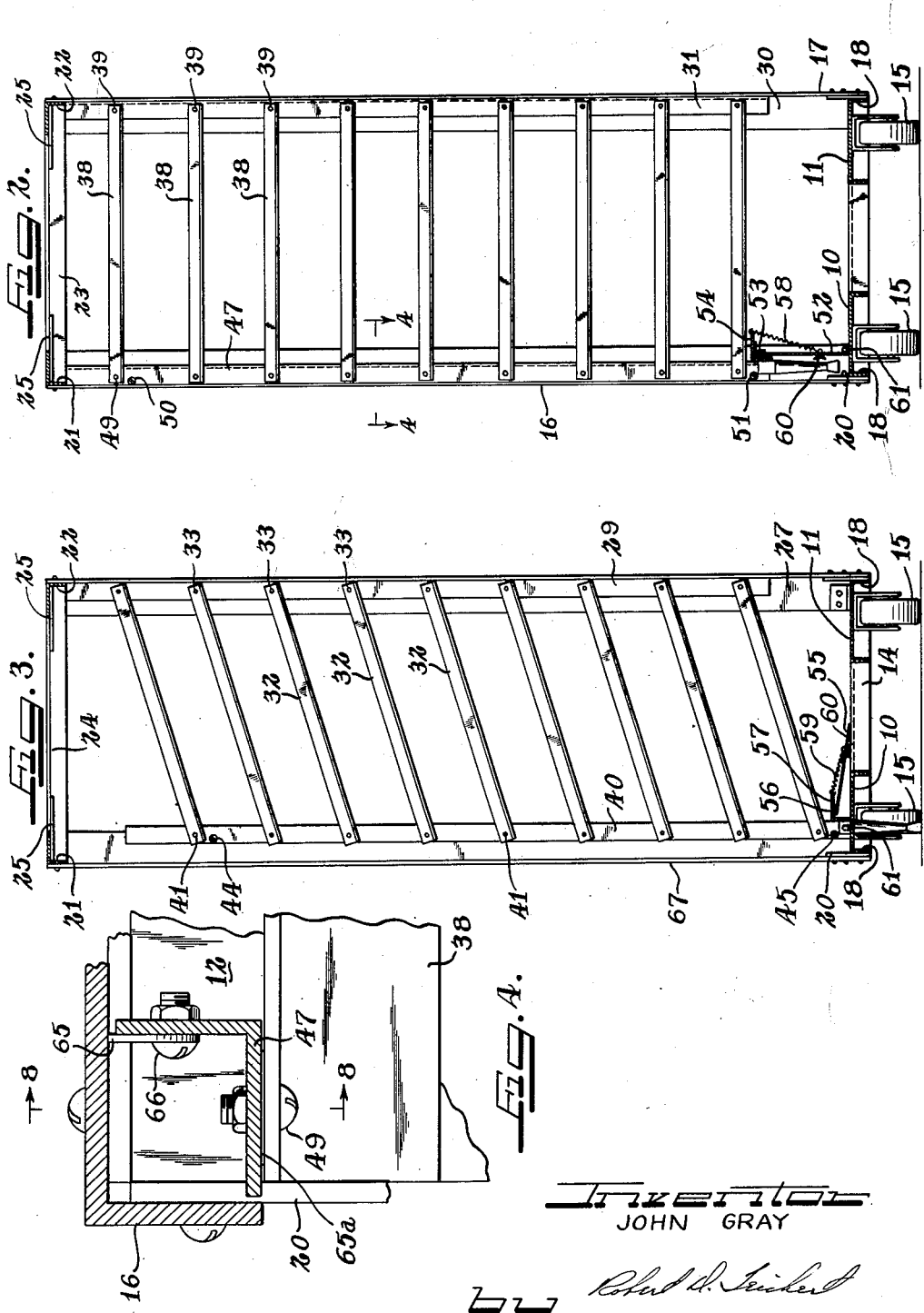
INVENTOR
JOHN GRAY Nov. 26, 1963    J. GRAY    3,111,915
MERCHANDISE HANDLING RACK
Filed Feb. 5, 1962    4 Sheets-Sheet 3
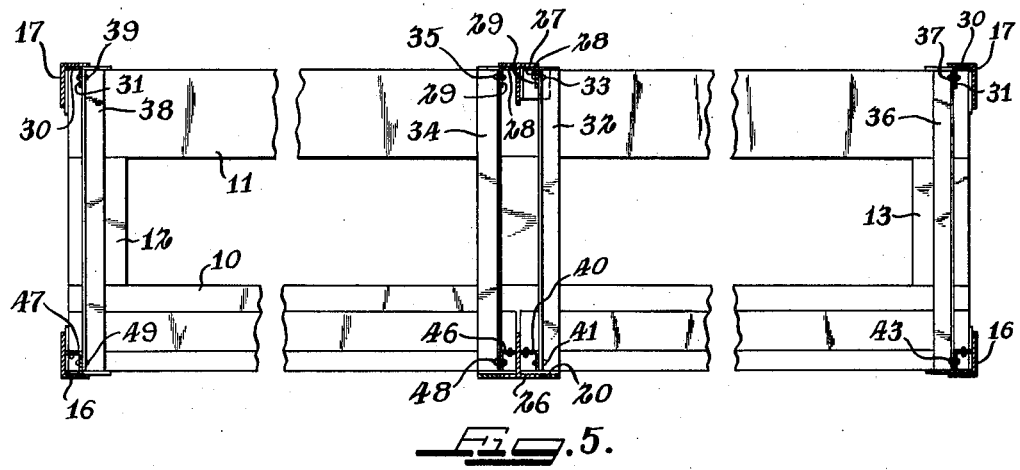
Fig. 5.
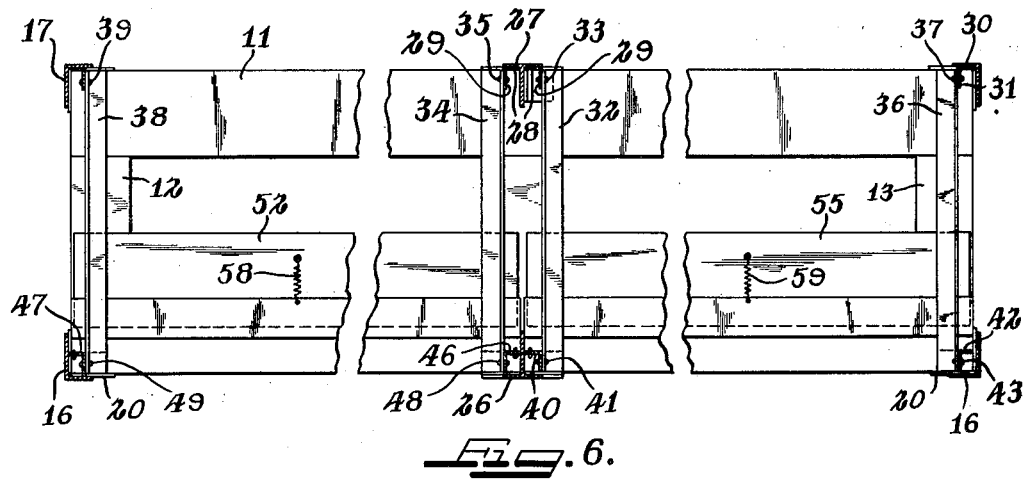
Fig. 6.
Fig. 8.
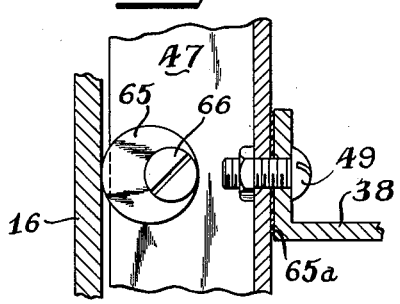
INVENTOR
JOHN GRAY
by Robert A. Seibert
Atty.

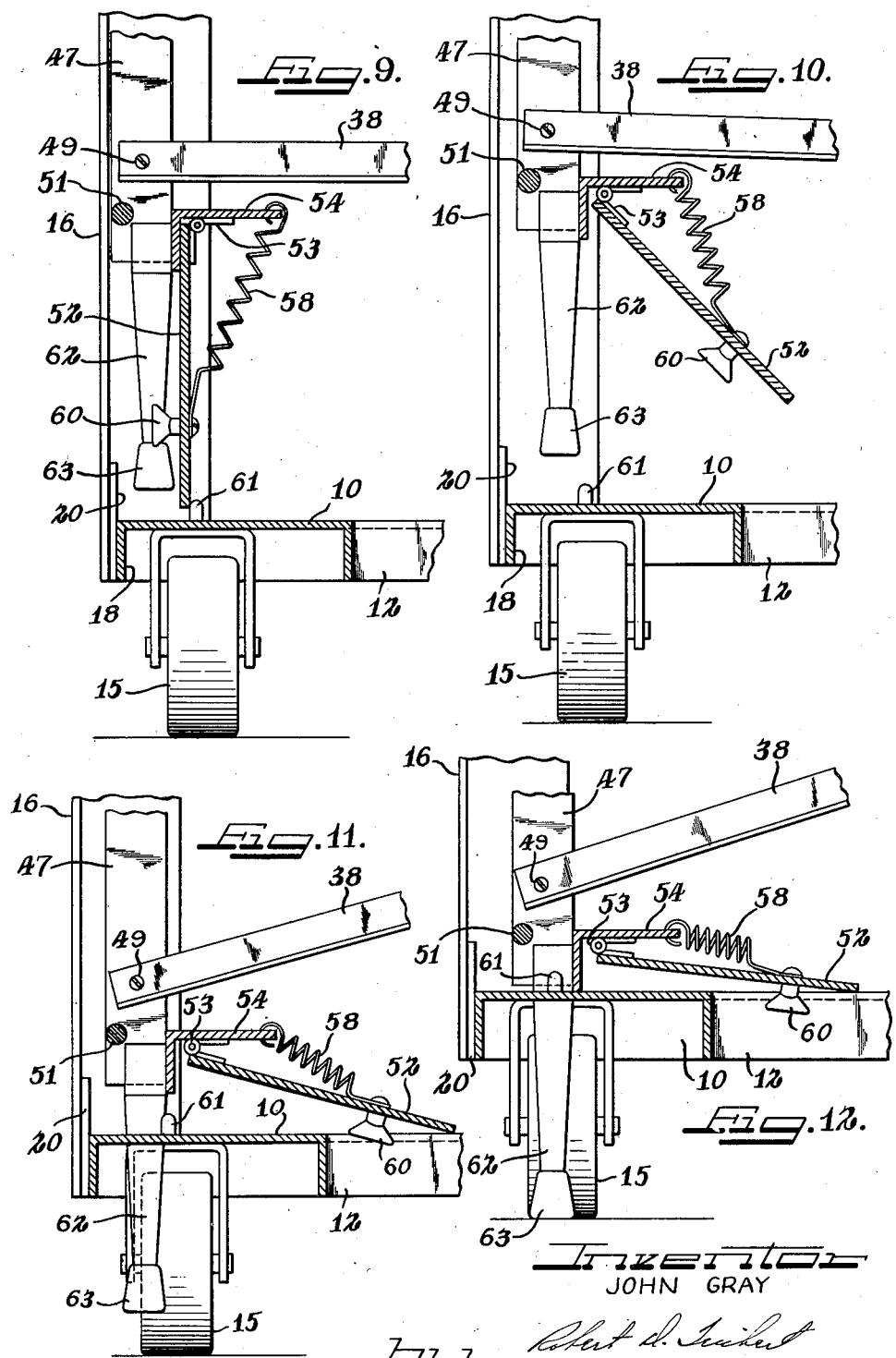

United States Patent Office 3,111,915
Patented Nov. 26, 1963

3,111,915
MERCHANDISE HANDLING RACK
John Gray, Glenview, Ill., assignor to Ekco Products Company, Chicago, Ill., a corporation of Delaware
Filed Feb. 5, 1962, Ser. No. 171,004
7 Claims. (Cl. 108—6)

This invention relates to a merchandise handling rack designed for use in the transfer and storage of merchandise, such for example as bread loaves and other baked goods, and also for service as a merchandise display rack unit from which the merchandise may be conveniently selected and withdrawn by the purchaser. By thus doubling as a transfer rack as well as a display and dispensing unit, the present invention provides a fast, easy and efficient means for handling baked goods between the production line and the shelf from which the purchaser selects the baked goods, with a consequent saving in time and cost of operation in the handling and distribution of baked products.

An important object of the present invention is to provide a rack of the character indicated wherein shelf rails for supporting a series of trays or containers for baked goods and the like in vertically spaced relation may be rocked between a raised horizontal position and a lowered forwardly and downwardly inclined position. The lowered position provides means for allowing articles of baked goods to slide by gravity from a rearward position on the trays to a forward position at the front of the rack from which the articles may be viewed and conveniently removed by the customer.

Still another object resides in the provision of novel means for controlling the operation of said shelf rails between raised and lowered positions.

Another object is to provide a wheel supported rack of the character indicated for facilitating its movement from place to place in combination with novel means for arresting such movement and thereby securely anchoring the rack in a fixed position when so desired.

With the above and other objects in view, this invention resides in the novel features of form, construction, arrangement and combination of parts presently described and pointed out in the claims.

In the drawings:

FIG. 1 is a perspective view of a merchandise display rack in accordance with one embodiment of the present invention, in connection with which trays are shown containing loads of bread loaves as an example of use to which the rack is especially adaptable.

FIG. 2 is a vertical section taken along line 2—2 of FIG. 1.

FIG. 3 is a similar section taken along line 3—3 of FIG. 1.

FIG. 4 is an enlarged fragmentary sectional view taken along line 4—4 of FIG. 2.

FIG. 5 is a horizontal section taken along line 5—5 of FIG. 1 with portions removed.

FIG. 6 is a similar section taken along line 6—6 of FIG. 1 with portions removed.

FIG. 7 is a similar section taken along line 7—7 of FIG. 1 with portions removed.

FIG. 8 is an enlarged fragmentary sectional view taken along line 8—8 of FIG. 4.

FIGS. 9, 10, 11 and 12 are enlarged transverse sectional views, with parts in elevation, showing details of the shelf rail positioning controls in successive stages of operation between initial and advanced positions during which the rails of the rack unit are rocked between raised and lowered positions.

Referring specifically to the drawing, a rack assembly representing one embodiment of the present invention includes a base of rectangular plan and upright frames at opposite ends thereof. The base is of open construction having front and rear downwardly facing channel members 10 and 11, connected by cross members 12 and 13 at opposite ends of the members 10 and 11 and a central cross member 14. To accommodate movement of the rack from place to place as needed, the base is provided with appropriate wheels shown as casters 15. The upright frames at opposite ends of the base are made up of angle iron corner posts 16 rising upwardly from the front corners of the base, and similar posts 17 rising upwardly from the rear corners of the base. The lower ends of the posts 16 and 17 overlap flanges 18 along the exposed edges of the channel members at the corners of the base and are rigidly secured to the base by suitable means such as by rivets 19 penetrating the posts 16 and 17 and the portions of flanges 18 of the base overlapped thereby. Gusset or angle plates 20 are used to reinforce the joint thus established between the posts 16 and 17 and the flanges 18 of the base. The front posts 16 are interconnected by a front longitudinal member 21 while the rear posts 17 are joined by a rear longitudinal member 22. The members 21 and 22 are interconnected from front to rear by transverse cross members 23 at opposite ends of members 21 and 22 and a central cross member 24 midway between the cross members 23. Gusset or angle plates 25 are used to reinforce the joint between said cross members 22, 23, and 24, and said front and rear members 21 and 22. The area between the end frames thus defined by the upright front and rear corner posts 16 and 17 is divided from front to rear along a line midway between said end frames by a partition framework comprising a front center post 26 and a rear center post 27. Each post 26 and 27 is of T-shaped cross-sectional contour with the aligned webs forming the head of the posts arranged lengthwise of the front and rear edges of the base while the web forming the trunk of each post extends inwardly of the area between said front and rear edges of the base to present its opposite faces in planes parallel to the end frames defined by the front and rear corner posts 16 and 17. L-shaped vertical bars 28 are disposed along the inwardly facing corners defined by the webs of the rear central post 27. Each bar 28 has a forwardly facing wing or web welded or otherwise permanently fixed to the forwardly facing web of post 27 overlapped by said forwardly facing web of bar 28 while the other wing or web of each bar 28 designated by reference numeral 29 occupies a plane in forwardly extending spaced parallel relation to the web forming the forwardly extending trunk of post 27. L-shaped vertical bars 30 are also disposed along the inwardly facing corners defined by the webs of the rear corner posts 17 and each bar 30, like the bars 28, has a forwardly facing wing or web thereof welded or otherwise permanently joined to the inner face of the web of the associated post 17 facing forwardly of the area within the rack while the other wing or web of each bar 30, designated by reference numeral 31, extends forwardly in spaced parallel relation to the web forming the forwardly extending web of the post 17. Thus web 29 of vertical bar 28 and web 31 of vertical bar 30 within the area of the rack at one side of the median framework defined by front and rear center posts 26 and 27 provide a first pair of related parallel upright supports along the rear of the rack while web 29 of vertical bar 28 and web 31 of vertical bar 30 in the area at the opposite side of the median framework provides a second pair of parallel upright supports along the rear of the rack.

Reference numeral 32 represents a series of shelf rails which are connected at one end to the wing 29 of bar 28 at one side of rear post 27 by bolts or rivets 33 while numeral 34 represents a similar series of rails connected at one end to the wing 29 of the bar 28 at the other side of rear post 27 by bolts or rivets 35. The bolts or rivets 33 and 35 are spaced at selected vertical distances apart along said bars 28 to provide vertically spaced apart axes on which said rails may swing or rock between upwardly and downwardly rocked positions. Each rail 32 has a companion rail 36 connected at one end to the web 31 of the vertical bar 30 at the rear corner of the rack toward which the rail 32 faces. Bolts or rivets 37 through which the rails 36 are connected to the web 31 of bar 30 are so spaced apart as to provide pivots in axial alignment with the bolts 33 connecting rails 32 to web 29 of bar 28 associated therewith. Connected to the web 31 of the vertical bar 30 at the rear corner of the rack facing the rails 34 are a set of rails 38 in companion relation to the rails 34. Bolts or rivets 39 which provide for connection of the rails 38 to said web 31, are likewise in axial alignment with the bolts 35. A vertical bar 40 to which the swinging ends of rails 32 are pivotally joined in parallel relation by bolts or rivets 41 and similar bar 42 to which the swinging ends of companion rails 36 are similarly joined by bolt 43, and upper and lower cross bars 44 and 45 respectively rigidly connecting the vertical bars 40 and 42 combine to establish a parallel linkage through which the rails 32 and 36 rock or swing in unison between upwardly and downwardly rocked positions on pivots established by the bolts 33 as to rails 32 and bolts 37 as to rails 36. In thus linking the rails 32 and 36 while the latter are moved between upward and downwardly rocked positions, the bars 40 and 42 have movement in unison between front and rearward positions along paths disposed inwardly of and parallel to the front upright posts 16 and front center post 26 of the rack.

In the same manner that the rails 32 and 36 are linked for movement in unison about the pivots established by bolts 33 and 37, the companion rails 34 and 38 are linked for rocking movement in unison about pivots established by bolts 35 and 39 respectively via vertical bars 46 and 47 to which the rails 34 and 38 are respectively connected by bolts 48 and 49 and cross bars 50 and 51 rigidly joining said bars 46 and 47.

A plate 52 hinged as at 53 to a cross bar 54 secured to and spanning the space between lower ends of the bars 46 and 47 has swinging movement between an upright position and a collapsed position to control the rocked position of the rails 34 and 38 linked by said bars 46 and 47. As shown in FIG. 2, the lower edge of the plate 52 has downward engagement with the surface of the rack base therebelow to support the bars 46 and 47 in a raised position effective to maintain the rails 34 and 38 in a horizontally extending condition. A similar plate 55 hinged as at 56 to a cross bar 57 connecting the bars 40 and 42, likewise has downward engagement with the base of the rack along the lower edge of the plate 55 to support the bars 40 and 42 in a raised position to maintain the rails 32 and 36 in a horizontally extending state. As shown in FIG. 3, the plate 55 when rocked into a collapsed state, allows the bars 40 and 42 to move downward to a lower position effective to rock the rails 32 and 36 into a forwardly and downwardly inclined state. A spring 58 associated with plate 52 and a similar spring 59 associated with plate 55 each act to bias the associated plate toward a collapsed position. When it is desired to raise the rails of the unit with which the plate 52 or the plate 55 is associated from downwardly rocked position, the plate is pulled outwardly by manually engaging a button 60 along the lower edge of the plate while the cross bar linking said rails (such as bar 51 in FIGS. 9, 10, 11 and 12 inclusive) is lifted to a raised position. A stop 61 projecting upwardly from the rack base in the path of swinging movement of the plate between upright and collapsed positions of the plate is effective to trap the plate in an upright position after the plate is swung forwardly from its collapsed position a distance sufficient to hurdle the stop 61. To permit the plate to swing from its upright position to its collapsed position, the bar of the rack unit to which plate is hinged must be raised a distance sufficient to clear the stop 61 as shown in FIG. 9, whereupon the spring 59 with which the plate is associated will cause the plate to swing to a collapsed position, as shown in FIGS. 10, 11 and 12, allowing the rails of the rack unit thus controlled by operation of the plate to rock to a downwardly inclined position. In connection with such lowering of the rails to a downwardly rocked position, legs 62 forming downward extensions of the upright bars linking the rails have downward engagement with the floor or surface on which the wheels 15 have bearing support to arrest rolling movement of the wheels 15. To assist in such braking action, the lower extremities of each leg 62 is provided with a rubber tip 63. A suitable opening 64 provided in the base of the rack allows the legs 62 to have clearance for travel from a position above the base of the rack (corresponding to the raised position of the rails) to a lowered position in which the rails are downwardly and forwardly inclined, as shown in FIGS. 9, 10, 11 and 12. In such lowered position, the weight of the load carried by the rails is directly applied to the floor at the surface of the rubber tip 63 engaging the floor.

During raising and lowering movements of the vertical bars 40, 42, 46 and 47 to effect selected positioning of the rails linked by such bars, suitable bearings 65 of synthetic material secured to each of said bars, as shown in FIG. 4, have sliding engagement with inwardly facing surfaces of the front corner posts 16 and 17 and the front center post 26 facing said bars. Thus the vertical bars 40, 42, 46 and 47 have guided movement along the inwardly facing surfaces of the front corner posts and front center post which are parallel to the path of rocking movement of the rails between raised and lowered positions. As shown in FIG. 8, each bearing 65 is of circular contour and is mounted on the vertical bar with which it is associated by means of a screw 66 providing an off-center axis on which the bearing 65 may be turned and held in selected rotated positions. Such adjustment of the bearing 65 makes it possible to compensate for reduction in radial dimension of the bearing 65 incident to wear on the latter and thus insures action of the bearing 65 even though worn, to maintain a predetermined positioned relation between the vertical bars 40, 42, 46 and 47 and the surfaces of the front corner posts and front center posts along the path of vertical movement of such vertical bars during operation of the latter to rock the rails between upper and lower positions. Each upwardly and downwardly operating upright bar 40, 42, 46 and 47 and the shelf rails pivotally joined thereto are separated along interfacing surfaces thereof by means of a spacer 65a of self lubricating material, such as nylon, to provide a relatively friction free joint therebetween. As shown in FIG. 8, the spacer 65a is supported on the bolt on which the shelf rail pivots with reference to the associated upright bar, as for example the bolt 49 joining shelf rail 38 to upright bar 47.

The rails, as shown in FIG. 1 provide vertically spaced supports throughout the height of the rack unit, on which trays T, each containing loaves of bread B, are maintained in separate layers or flights so as to protect the goods against crushing and thereby available to the purchaser in fresh-looking display condition. The trays T have entry to the space within the rack area via the rear or loading side of the rack which is defined by the rear corner posts 17 and rear center post 27. Extension wings 67 along opposite upright edges of the front center post 26 provide stops with which the frontward facing edges of the trays T are engageable to retain the latter against withdrawal from the front or take-out side of the rack.

While a rack unit embodying the present invention is particularly adapted for use in handling baked goods as illustrated in FIG. 1, the rack may be used for a wide variety of other products with equal efficiency. Also, as shown herein, the rack is divided midway of its length so as to provide for stacking of trays in two columns or tiers. It will, however, be understood that the rack may be modified to include only a single column or tier or three or more columns or tiers where a greater number of such columns or tiers may be desired.

What is claimed is:

1. A merchandise handling rack including a base of rectangular plan, corner posts rigidly fixed to and extending upwardly from said base to define a front supporting frame and a rear supporting frame, a first pair of shelf rails mounted on said rear supporting frame for coaxial vertical rocking movement between a horizontal position and a downwardly and forwardly rocked position, a second pair of shelf rails mounted on said rear supporting frame for coaxial vertical rocking movement about an axis in vertically spaced parallel relation to said axis of rocking movement of said first pair of shelf rails, means linking said first and second pairs of shelf rails for rocking movement in unison including an upright member to which the shelf rails are pivotally connected, said front supporting frame presenting surfaces parallel to the path of rocking movement of said upright member and said shelf rails, said upright member having guided engagement with said surfaces of said front supporting frame via bearings secured to said upright member.

2. A merchandise handling rack according to claim 1, wherein said bearings are of circular periphery, and each bearing is secured to said upright rail linkage member for movement to selected rotated positions about a fixed axis in eccentric relation to the periphery of said bearing.

3. A merchandise handling rack according to claim 1, wherein said bearings are of synthetic resinous material and of circular periphery with said periphery arranged radially of an axis extending lengthwise of the path of rocking movement of said shelf rails.

4. A merchandise handling rack according to claim 1, wherein said base is provided with supporting wheels and said upright member has a downward extension defining a leg effective to arrest movement of said wheels when said upright member is moved in response to downward rocking movement of said shelf rails.

5. A merchanidse handling rack according to claim 1, wherein a control member movable between upstanding position and a position inclined relative to said upstanding position about an axis in fixed relation to said upright member is effective when in upstanding position to releasably secure said shelf rails in a horizontal position.

6. A merchandise handling rack according to claim 1, wherein a control member movable between upstanding position and a position inclined relative to said upstanding position about an axis in fixed relation to said upright member and parallel to the axis of rocking movement of said shelf rails is effective when in upstanding position to releasably secure said shelf rails in a horizontal position.

7. A merchandise handling rack according to claim 1, wherein said front supporting frame presents rearwardly facing surfaces with which articles supported on said shelf rails have engagement to retain said articles against withdrawal from the front of said rack.

References Cited in the file of this patent

UNITED STATES PATENTS

| | | |
|---|---|---|
| 462,082 | High | Oct. 27, 1891 |
| 638,443 | Canedy | Dec. 5, 1899 |
| 775,388 | Thompson | Nov. 22, 1904 |
| 908,000 | Herbin | Dec. 29, 1908 |
| 1,010,036 | Foltz | Nov. 28, 1911 |
| 1,554,137 | Slifkin | Sept. 15, 1925 |
| 1,605,291 | Schmidt | Nov. 2, 1926 |
| 1,953,562 | Lansing | Apr. 3, 1934 |
| 1,961,394 | Rothe | June 5, 1934 |
| 2,746,815 | King | May 22, 1956 |